July 21, 1959 P. J. LYNSKEY 2,895,823
METHOD OF FURTHER REDUCING THE REACTION PRODUCTS
OF A TITANIUM TETRACHLORIDE REDUCTION REACTION
Filed March 19, 1957
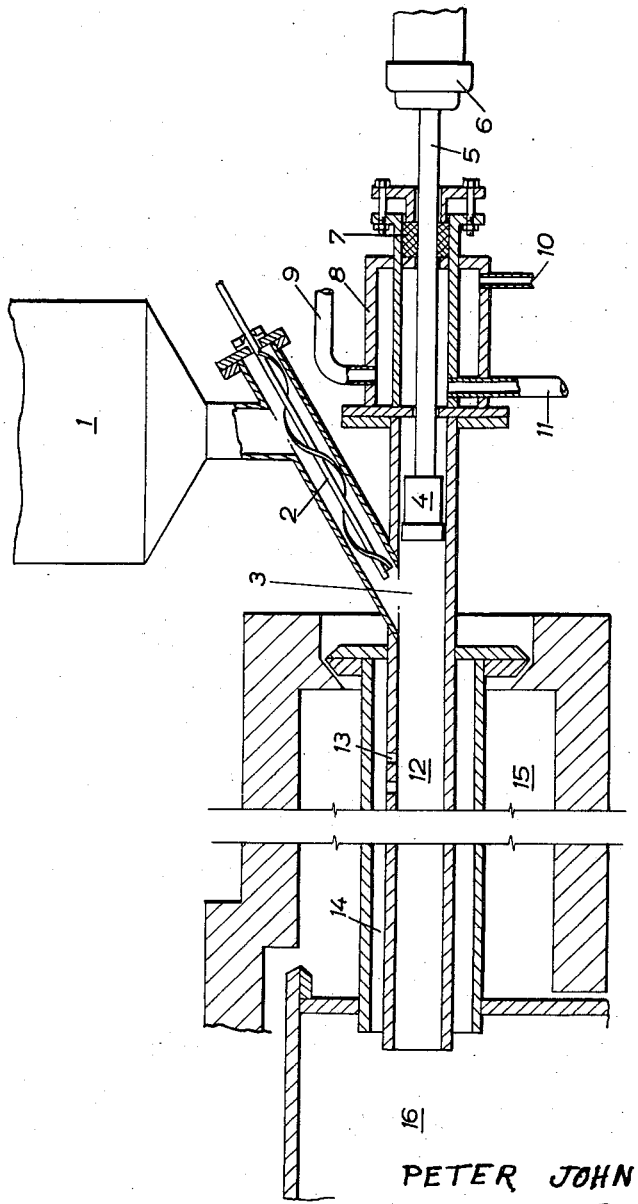
Inventor
PETER JOHN LYNSKEY
By
Mead, Browne, Schuyler & Beveridge
Attorneys United States Patent Office 2,895,823
Patented July 21, 1959

2,895,823

METHOD OF FURTHER REDUCING THE REACTION PRODUCTS OF A TITANIUM TETRACHLORIDE REDUCTION REACTION

Peter John Lynskey, Woolton, Liverpool, England, assignor to Peter Spence & Sons Limited, Widnes, England Application March 19, 1957, Serial No. 646,990

Claims priority, application Great Britain March 20, 1956

2 Claims. (Cl. 75—211)

This invention relates to an improved method and apparatus for heat treating freshly produced titanium metal.

Ductile titanium prepared in a batchwise fashion using, for example, sodium, magnesium, or calcium metal as a reducing agent, yields a product in the form of a dendritic growth or "sponge." In developing a process for the continuous, as against the batchwise production of the metal, the tendency to form such sponge-like growths, and particularly the tendency for them to adhere to the walls of the containing vessel, must be overcome, and there is a tendency in some of the continuous reactors which have been developed, to yield a product which is not sufficiently stable to be exposed to the atmosphere in the form in which it leaves the reactor. By "lack of stability" it is not intended to infer that the material need be so unstable as, for example, to be pyrophoric at ambient temperatures, but rather that a degree of contamination occurs which adversely affects the mechanical properties of the ductile titanium subsequently produced. Typical reasons advanced to explain this instability are:

(1) That the titanium metal particles have such a large surface area that an adsorbed oxygen or nitrogen layer causes the incorporation of undesirably large amounts of oxygen or nitrogen during subsequent melting of the titanium to produce massive metal.

(2) That highly hygroscopic and relatively unstable lower chlorides of titanium are present in the product which would hydrolyze or oxidize in the presence of water or air and would therefore cause the resultant metal to be contaminated, particularly if separation of the by-product reducing metal compound is carried out by a leaching technique.

(3) That where the reducing metal is itself easily hydrolyzed or oxidized, especially if sodium is used, the reactivity of excess reducing metal may give rise to trouble and it may be necessary to remove excess reducing metal before the separation of the other by-products is commenced.

It is already known that treatment of the reaction products at elevated temperature for a period has been found efficacious in such cases. One such method of treatment is described in British Patent 720,517. To be fully effective the straight application of the heat treatment technique (referred to as "heat soaking") tends to nullify some of the advantages of the continuous process which may have been used to produce the products of reaction. For example, taking the case described in Patent 720,517, involving the reduction of titanium tetrachloride with sodium metal, the heat soaking is carried out at such a temperature that the sodium chloride melts and the discreet particles of titanium metal adhere together to form a sponge-like growth not dissimilar to the growth produced in a straight-forward batch reduction. There appears to be, however, a basic difference between the material produced during a heat soaking and the product of a batch reduction, and this appears to be that in the heat soaking all the heat is added in a controlled fashion and therefore the temperatures throughout may be kept controlled effectively, whereas during the reduction stage such which is extremely exothermic, it does not seem to be possible to prevent local excessive temperatures which cause the product mass to adhere to the retaining vessel. Whether or not this be the reason, we have found that we can carry out the heat soaking step in a truly continuous fashion so that by marrying the continuous heat soaking apparatus to a continuous reduction stage such as that described in our co-pending application Ser. No. 546,692, the whole of the reduction and stabilization stages can be truly continuous (here using the word "continuous" in the broad sense to differentiate from batch processes).

According to the present invention a method of heat treating freshly prepared titanium metal obtained by reduction of titanium tetrachloride comprises propelling under compression and in continuous fashion the reaction products from the titanium tetrachloride reduction through a zone of controlled heat for a period of time sufficient to stabilize the titanium metal present in said reaction products and using said reaction products or a part thereof to self lubricate the passage of the titanium metal through the heat zone.

In one convenient form of the invention the reaction products may be extruded through a cylindrical container heated externally, said cylindrical container being imperforate save for the presence of one or more vent holes for volatiles present in the reaction products. The feed rate and length of the cylindrical container are chosen such that sufficient heating time is allowed to stabilize the titanium metal during its passage along the cylindrical container.

According to another aspect of the invention a method of heat treating freshly prepared titanium metal obtained by metal reduction of titanium tetrachloride consists in feeding the reaction products from the titanium tetrachloride reduction continuously into a substantially imperforate cylindrical container in synchrony with the reciprocating motion of a ram associated with the entry to said cylindrical container and adapted to propel the reaction products along said cylindrical container progressively at a rate which is calculated to ensure that sufficient heating time is provided within which to stabilize the titanium metal present in the reaction products.

The actual heating time necessary will depend upon the nature of the products being treated, but typically in the case of titanium tetrachloride reduced by sodium, could be one hour at a temperature of between 850° and 950° C.

An application of the invention designed for the treatment of the product from a continuous reactor in which titanium tetrachloride is reduced to metal by means of sodium in quantity of a little in excess of that stoichiometrically equivalent to the titanium tetrachloride will now be described with reference to the accompanying diagrammatic drawing.

The products of reaction of the continuous sodium reduction reactor are received in surge hopper 1, which is of gas-tight construction and may be fitted with vibrating means to assist the flow of solids. From this hopper the product is fed by feeding means, here shown as a screw conveyor, intermittently in the form of slugs, to the throat 3 of the heat treatment apparatus. The feeding mechanism 2 is synchronised with piston 4 operated via shaft 5 by hydraulic ram 6. The synchronised operation of ram 6 and the feeder 2 is automatic. The point of entry of the shaft for the solids feeder and the piston must be sealed so as effectively to exclude atmospheric contamination from the apparatus. In this case the former is shown as a Wilson seal and the latter as a packed gland 7, cooled by jacket 8 fed with water via pipes 9 and 10, argon being admitted through duct 11 to maintain a slight positive pressure on the inside of the apparatus. Piston 4 propels the slugs of fresh product into the heated pipe 12 constituting the heat soaking section, forcing a slug of product against that material already in the tube and driving the whole down the tube by an amount equal to the thickness of the compressed freshly added slug. Under the influence of the sudden temperature increase there is a tendency for any excess sodium metal to vaporize which may have the effect of propelling the main body of material in the heated tube towards the outlet. This effect is undesirable as it gives rise to fluctuations in the heating time and therefore vent holes 13 are added allowing the pressure build-up to be dissipated harmlessly into annular space 14. The requisite temperature (850° to 950° C.) is maintained over the heat soaking section by the heating furnace 15. At this temperature the particles of titanium metal in the matrix of molten salt adhere together to form a sintered generally cylindrical mass whose surface area is considerably less than that of the original metal particles. The sodium chloride, which comprises some 85% of the whole, melts and a large proportion flows down the tube towards the discharge end 16 and acts as a lubricant between the sintered cylindrical titanium metal mass and the walls of the containing pipe 12. The sintered cylindrical titanium metal mass tends to retain some of the sodium chloride and typically may have finally a titanium content of between 30% and 40%. By the discharge end of the apparatus 16, the product has assumed the form of a compacted cylinder containing from 30% to 40% titanium, the remainder sodium chloride, any lower chlorides of titanium having been reduced by the excess sodium or driven off, any excess sodium vaporised away and the fine particles of titanium metal having agglomerated in such a way as substantially to reduce their surface area. Having, incidentally, vaporised the excess sodium metal and liquified the sodium chloride, there is obvious economic advantage in separating the phases, especially so in the case of the sodium which for economic operation should be recycled in its relatively uncontaminated metallic form. This is not however the main object of the invention, which is concerned with carrying out the heat soaking step in a continuous fashion.

The operation may be completed by causing the material to cool down to close to normal atmospheric, temperature out of contact with air. Possible ways of accomplishing this end are to allow the extruded cylindrical mass after it has left the containing tube to break periodically and fall into one of several hoppers via a movable chute mechanism, the hoppers being cooled and emptied on a cycle such that sufficient time is allowed between filling and emptying for the contents of that particular hopper to cool completely.

Alternatively the extruded cylindrical mass can be conveyed on a roller conveyor device through a closed cooling tunnel through which for added cooling effect, externally cooled argon may be circulated, the material finally being discharged through air locks.

I claim:

1. A continuous method of heat treating the reaction products of a continuous reactor for titanium metal production wherein the reactants consist essentially of sodium and titanium tetrachloride and the reactor products consist essentially of titanium metal particles, sodium metal, molten sodium chloride and lower chlorides of titanium comprising introducing said reaction products into one end of an elongated zone of controlled heat containing an atmosphere inert to said reaction products, maintaining said zone at a temperature of from 850° to 950° C., continuously moving said reaction products through said elongated zone for a period of time sufficient to complete the reaction initiated in the continuous reactor, venting volatile vapors from said reaction zone, agglomerating the particles of titanium metal within said zone to form a sintered mass having a surface area of less than that of said titanium metal particles, continuously removing said sintered mass and said molten sodium chloride from said other end of said zone, said molten sodium chloride lubricating and thus facilitating the passage of said sintered mass of titanium metal through and from said zone.

2. Apparatus for treating the reaction products of a continuous reactor for titanium metal production wherein sodium and titanium tetrachloride constitute the reactants comprising an elongated horizontally-disposed enclosed cylindrical heat treatment chamber having an inlet end, an outlet end and at least one vent opening for volatile vapors on the upper surface thereof, means on the outer surface of said chamber for heating said chamber to a predetermined temperature and maintaining the chamber at said temperature, means adjacent said inlet end for delivering said reaction products into said chamber, and reciprocating means adjacent said inlet end for forcing said reaction products into and through said heat-treatment chamber to and through said outlet end.

References Cited in the file of this patent

UNITED STATES PATENTS 2,676,882    Hatch                 Apr. 27, 1954
2,778,726    Winter et al.           Jan. 22, 1957